United States Patent
Brück

(10) Patent No.: US 7,179,767 B2
(45) Date of Patent: Feb. 20, 2007

(54) SMALL-VOLUME $NO_x$ ADSORBER

(75) Inventor: Rolf Brück, Bergisch Gladbach (DE)

(73) Assignee: Emitec Gesellschaft für Emissionstechnologies mbH, Lohmar (DE)

( * ) Notice: Subject to any disclaimer, the term of this patent is extended or adjusted under 35 U.S.C. 154(b) by 294 days.

(21) Appl. No.: 10/426,525

(22) Filed: Apr. 30, 2003

(65) Prior Publication Data

US 2004/0071609 A1 Apr. 15, 2004

Related U.S. Application Data

(63) Continuation of application No. PCT/EP01/12314, filed on Oct. 25, 2001.

(30) Foreign Application Priority Data

Oct. 31, 2000 (DE) ................................ 100 53 904

(51) Int. Cl.
*B01J 20/00* (2006.01)
(52) U.S. Cl. .................................... 502/400; 423/239.1
(58) Field of Classification Search ................ 423/212, 423/239.1; 502/400, 439
See application file for complete search history.

(56) References Cited

U.S. PATENT DOCUMENTS 3,896,616 A * 7/1975 Keith et al. ................... 60/274
5,795,553 A 8/1998 Lott et al.
6,471,924 B1 * 10/2002 Feeley et al. ............ 423/213.5
6,478,854 B1 * 11/2002 Kotagiri et al. ................. 95/96
6,616,904 B1 * 9/2003 Becue et al. ............. 423/239.1

FOREIGN PATENT DOCUMENTS

| DE | 196 36 041 A1 | 3/1998 |
| EP | 0 470 653 A1 | 2/1992 |
| EP | 0 785 017 A1 | 7/1997 |
| EP | 1 053 777 A1 | 11/2000 |
| WO | 00/67881 | 11/2000 |

* cited by examiner

*Primary Examiner*—Edward M. Johnson
(74) *Attorney, Agent, or Firm*—Laurence A. Greenberg; Werner H. Stemer; Ralph E. Locher

(57) ABSTRACT

A support body is described which has an adsorber material for adsorbing nitrogen oxides in an exhaust gas which is generated in at least one combustion chamber of an internal-combustion engine. A method is described for operating an internal-combustion engine having an exhaust system which has a support body of this type. All the combustion chambers of the internal-combustion engine together have an overall combustion chamber volume, and the support body has an adsorber volume. The adsorber volume is configured to be less than 75%, in particular less than 45%, and preferably even less than 5% of the combustion-chamber volume. A support body of this type ensures a good cold-starting performance of the exhaust system and prevents the emission of nitrogen oxides, in particular when using the proposed method of operating the exhaust system.

20 Claims, 3 Drawing Sheets

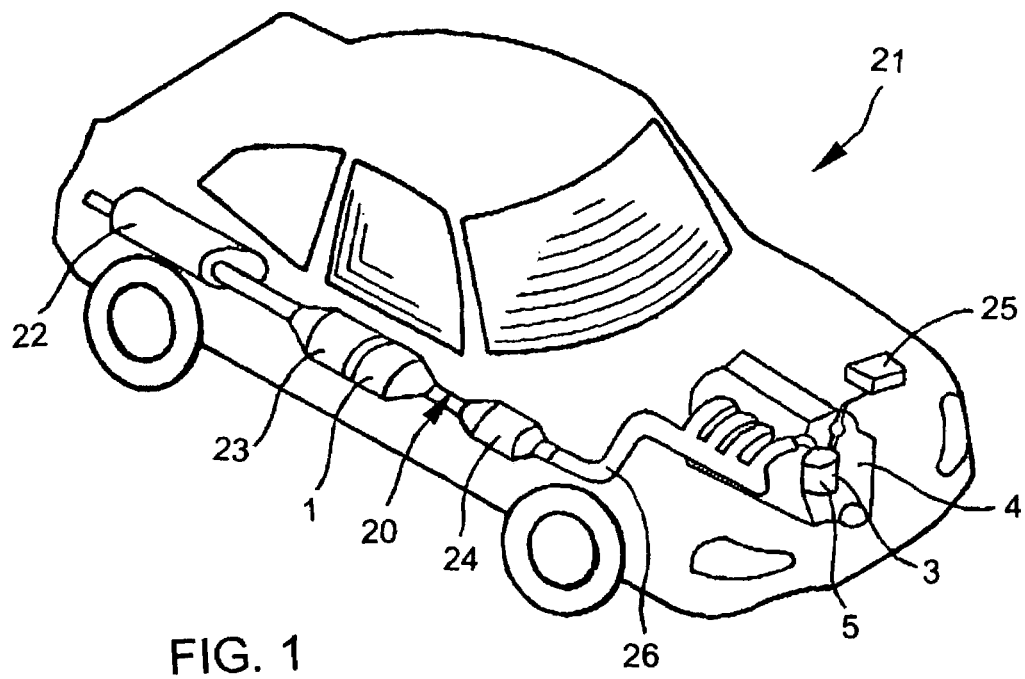
FIG. 1
FIG. 2
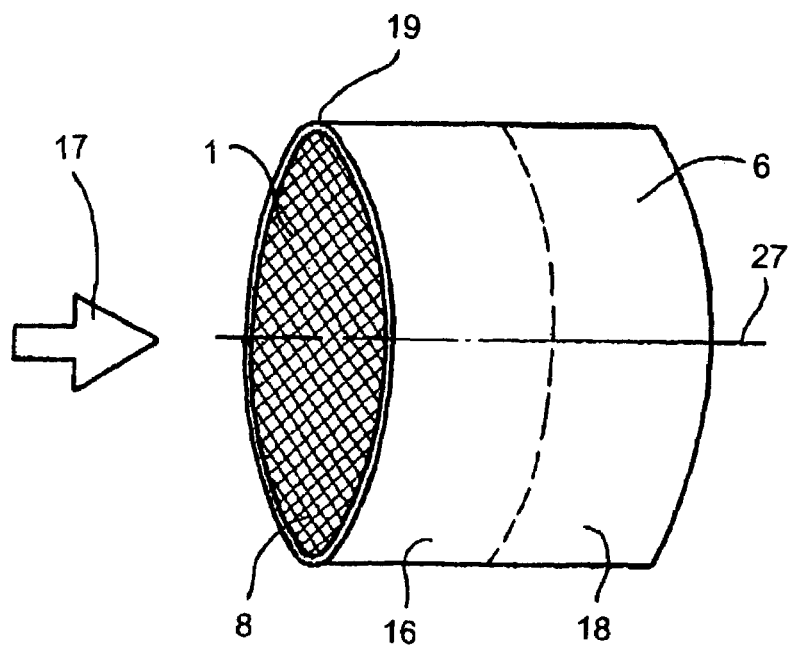

SMALL-VOLUME NO$_x$ ADSORBER

CROSS REFERENCE TO RELATED APPLICATION

This application is a continuation of copending International Application No. PCT/EP01/12314, filed Oct. 25, 2001, which designated the United States and was not published in English.

BACKGROUND OF THE INVENTION

1. Field of the Invention

The invention relates to a support body having an adsorber material for adsorbing nitrogen oxides in an exhaust gas that is generated in at least one combustion chamber of an internal-combustion engine. Support bodies of this type are preferably used in exhaust systems of mobile vehicles. Furthermore, the invention relates to an exhaust system that has a support body of this type and to a method of operating the exhaust system.

While in the event of complete combustion of a fuel composed only of carbon and hydrogen only the harmless substances of carbon dioxide ($CO_2$) and water ($H_2O$) are formed, exhaust gases from internal-combustion engines contain additional products resulting from incomplete oxidation, such as for example hydrogen ($H_2$) and carbon monoxide (CO) or partially burnt or unburnt hydrocarbons ($H_mC_n$). Moreover, the exhaust gas contains the oxidation products of nitrogen NO and $NO_2$. Since nitrogen oxides increase the formation of ozone close to the ground even in very small quantities (ppb range), emission of nitrogen oxides must be avoided.

In addition to the preventive measures aimed at reducing the nitrogen oxide concentration with the aid of a suitable engine management system, it is known to subject the exhaust gas that is generated to a cleaning procedure. To do this, by way of example a three-way catalytic converter is used, which removes the three most important pollutants (carbon monoxide, hydrocarbon, nitrogen oxide) from the exhaust gases. In this case, the carbon monoxides and the unburnt remainders of hydrocarbon are oxidized by the nitrogen oxide and oxygen to form carbon dioxide and water. The nitrogen oxides are reduced to form nitrogen. Although catalytic converters of this type allow these reactions to proceed quickly, they do not achieve complete reaction. One reason for this is that during certain operating states of the internal-combustion engine the residence time of the exhaust gas in the catalytic converter is so short that the reactions described above cannot take place completely. Effective reduction of the nitrogen oxides is only possible if a certain quantity of hydrogen or carbon monoxide is present in the exhaust gas while significant concentrations of oxygen are unacceptable. Therefore, the internal-combustion engine would preferably have to be operated in rich-burn mode (lambda<1), but this is undesirable in view of fuel consumption.

U.S. Pat. No. 5,795,553 discloses a support substrate with a coating that allows adsorption of nitrogen oxides in an oxygen-rich environment. This substrate desorbs the stored nitrogen oxide when a sufficient quantity of carbon monoxide and hydrocarbon is present in the exhaust gas. For this purpose, the coating has chemical compounds of an alkali metal with copper and hydrous zirconium oxide. The alkali metal used is preferably sodium or potassium. The support substrate allows nitrogen oxides to be stored when there is excess oxygen and ensures that the nitrogen oxides are desorbed when catalytic conversion using a catalytic converter is possible.

Furthermore, Published, Non-Prosecuted German Patent Application DE 196 36 041 A1 discloses a support substrate in honeycomb form with an adsorption layer for storing nitrogen oxides contained in the exhaust gas. The support substrate with an adsorption layer stores the nitrogen oxides when certain operating conditions prevail in the exhaust system, such as for example net oxidizing conditions ($\lambda > 1$ and $T > 150°$ C.), and releases these nitrogen oxides again when operating conditions change, in particular when there is a stoichiometric air-fuel ratio and elevated temperatures. To convert the temporarily stored nitrogen oxides, a downstream catalytic converter is proposed which, at temperatures of over 230° C., converts at least 50% of the nitrogen monoxides contained in the exhaust gas into nitrogen dioxides.

When configuring the storage capacity of a support substrate of this type, the light-off performance of a downstream catalytic converter should also be taken into account. The use of relatively large-volume nitrogen oxide stores leads to very large amounts of thermal energy being extracted from the exhaust gas in the cold-starting phase of the internal-combustion engine. This leads to delayed heating of the catalytic converter, which only begins catalytic conversion of the pollutants in the exhaust gas once a temperature of approximately 250° C. is reached. If the storage capacity of the nitrogen oxide store is too low, the result may be emissions of nitrogen oxide and therefore pollution of the environment.

SUMMARY OF THE INVENTION

It is accordingly an object of the invention to provide a small-volume No$_x$ adsorber which overcomes the above-mentioned disadvantages of the prior art devices and methods of this general type. Working on this basis, the present invention provides a support body with an adsorber material for adsorbing nitrogen oxides in an exhaust gas, the storage capacity of which is such that the cold-starting performance of the exhaust system is not significantly affected. Consequently, the intention is also to describe a corresponding exhaust system and a suitable method for operating the exhaust system, which significantly reduces the emission of nitrogen oxides into the environment. The intention being in particular to ensure that the adsorber material is regenerated in good time and therefore the storage capacity for the adsorption of nitrogen oxides is always available.

With the foregoing and other objects in view there is provided, in accordance with the invention, a support body. The support body contains an adsorber material for adsorbing nitrogen oxides in an exhaust gas generated in at least one combustion chamber of a plurality of combustion chambers of an internal-combustion engine, all the combustion chambers together defining a combustion-chamber volume. A support body structure carries the adsorber material and has a volume, and the volume of the support body structure is less than 75% of the combustion-chamber volume.

The support body according to the invention having the adsorber material for adsorbing nitrogen oxides in an exhaust gas has an adsorber volume. In this case, the adsorber volume includes any cavities or passages that are present in the support body. The exhaust gas is generated in at least one combustion chamber of an internal-combustion engine. A fuel-air mix is burnt in the combustion chamber and the exhaust gas is generated. Known internal-combustion engines preferably have 4, 6 or 8 combustion chambers of this type. All the combustion chambers together have a defined combustion chamber volume. For conventional passenger automobiles, the combustion chamber volumes are, for example, between 1.2 and 4.2 liters. For motorcycles, the combustion chamber volume is approximately 0.25 to 1.5 liters. The support body proposed here is distinguished by the fact that the adsorber volume is less than 75%, in particular less than 45%, and preferably even less than 5% of the combustion chamber volume. If the support body is to be disposed close to the engine, the adsorber volume may even be configured to be less than 1% or even less than 0.5% of the combustion chamber volume.

Surprisingly, tests have shown that it is possible to configure a nitrogen oxide adsorber with such a small volume. This contradicts the general opinion that, on account of the predominantly lean-burn (oxygen-rich) mode of operating the internal-combustion engine, it is necessary to reckon with a considerable increase in the emission of nitrogen oxides. An adsorber of such a small volume represents a relatively small thermal mass, with the result that only a very small amount of heat is extracted from the exhaust gas in the cold-starting phase of the internal-combustion engine. By way of example, this allows very rapid heating of a downstream catalytic converter, with the result that the light-off temperature for reduction of nitrogen oxides that are formed is achieved after only a very short time. A further consequence is that the support body with the adsorber material has to adsorb smaller amounts of nitrogen oxides, on account of the shorter time. The support body according to the invention therefore ensures effective reduction of nitrogen oxides in the exhaust gas from an internal-combustion engine (in particular lean-burn engines, and diesel engines), while avoiding even very small levels of emissions in the ppb (parts per billion) range.

According to one embodiment, the support body has a number of passages that are distributed over a cross section and through which the exhaust gas can flow, the mean passage density over the cross section being between 400 and 1200 cpsi (cells per square inch). Naturally, the particular desired adsorber volume and the distance of the adsorber from the internal-combustion engine are also to be taken into account when configuring the passage density. For very small adsorber volumes (in particular less than 20% of the combustion-chamber volume) and/or an installation site which is close to the engine (for example at a distance of less than 30 cm), it is in this case possible to use passage densities of up to approximately 600 cpsi, and under certain circumstances these densities may even have to be reduced still further (preferably in a range from 200 cpsi to 400 cpsi). The configuration with a relatively low passage density results in that, an excessive pressure drop in the exhaust-gas flow across the adsorber is avoided, and it is also ensured, by way of example, that there is no thermal overloading. If the adsorber volume is larger and/or the distance from the internal-combustion engine is greater, it is preferable to use adsorbers with higher passage densities. These adsorbers then have a passage density that is, for example, at least 700 cpsi, preferably greater than 1000 cpsi and in particular greater than 1600 cpsi. Such a high number of passages provide a large surface area containing the adsorber material. This ensures intensive contact between the exhaust gas and the adsorber material and improves the volume-specific storage capacity of the support body.

According to yet another embodiment, the support body has sheet-metal layers, at least some of which are structured in such a way that they form passages through which an exhaust gas can flow. A support body with sheet-metal layers has the advantage that, for the same volume, it has a larger surface area and a low pressure loss compared, for example, to a support body made from ceramic. The sheet-metal layers are preferably configured using metal sheets which have a thickness of from 0.012 to 0.08 mm, in particular of less than 0.03 mm. This leads to a low surface-specific heat capacity, with the result that the extraction of thermal energy from the exhaust gas is further reduced.

According to yet another configuration, the adsorber material has a zeolite structure and/or potassium oxide constituents. The geometric property of the zeolite structure ensures a very high storage capacity. The oxides of alkali metals, in particular potassium oxide, are particularly effective at assisting the adsorption of nitrogen oxides. Tests have shown that in particular a combination of potassium oxide constituents and a metallic support body ensures long-term and highly effective storage of nitrogen oxides.

According to a further configuration, it is proposed for the support body to have a catalytically active coating for reducing nitrogen oxides. In this way, given appropriate operating conditions, immediate reduction of the nitrogen oxides that have been desorbed or are just being produced is ensured. In this case, it is particularly advantageous for the adsorber material to be disposed in a first zone, the support body having, downstream as seen in the direction of flow of the exhaust gas, a second zone with the catalytically active coating. Axially dividing the support body into a first zone for adsorption and a second zone for reduction of the nitrogen oxides in this way results in a very simple structure and, for example, prevents contradictory chemical reactions as a result of the adsorption operation, on the one hand, and the catalytic conversion, on the other hand. In this case, it is always ensured that the desorbed nitrogen oxides subsequently come into contact with a catalytically active coating.

A further aspect of the invention proposes an exhaust system of an internal-combustion engine which contains at least one exhaust pipe which connects the at least one combustion chamber of the internal-combustion engine to the environment and in which components for converting pollutants contained in the exhaust gas from the internal-combustion engine are disposed. In this case, the support body according to the invention is disposed immediately downstream of the internal-combustion engine, as seen in the direction of flow of the exhaust gas. Particularly with a configuration of the support body of this type, the adsorber volume can be greatly reduced. In this case, the adsorber volume may even be configured to be less than 1% or even less than 0.5% of the combustion-chamber volume. This is related in particular to the high temperatures prevailing in that area, which promote regeneration of the adsorber material.

It is particularly advantageous for the support body to be disposed at a distance of less than 80 cm, in particular even less than 30 cm or even 5 cm, from the at least one combustion chamber. With this in mind, it is particularly appropriate for the support body to be disposed, for example, in the interior of an exhaust manifold, and preferably upstream of a turbo charger. In the configuration in which the support body is disposed in the interior of an exhaust manifold, there is also in each case one such support body in every manifold that leads to an individual combustion chamber. If the adsorber is suitably configured, it is even possible for it to be installed directly in the outlet passage of the combustion chamber of the internal-combustion engine. The adsorber volume then preferably relates to a total adsorber volume of the plurality of support bodies. The configuration even upstream of a turbo charger prevents large amounts of thermal energy being extracted from the exhaust gas even before it comes into contact with the support body, ensuring rapid and effective regeneration of the adsorber material.

Furthermore, a method of operating the exhaust system is proposed, in which discontinuous regeneration of the support body that has an adsorber material for adsorbing nitrogen oxides takes place within a time of less than 5 second, in particular less than 1 second. Such a short time or such dynamic regeneration allows the adsorber volume required for storage of the nitrogen oxides to be reduced further. Advantageously, this time can be shortened even to around less than 0.5 seconds or 0.1 seconds, in which case only very small quantities of nitrogen oxides would still have to be stored. However, in this extreme case, it is under certain circumstances necessary to provide a separate adsorber which is responsible for storing nitrogen oxides shortly after the cold start and just temporarily until the required temperatures of the exhaust gas are reached.

If the internal-combustion engine or the exhaust system has an engine management system for controlling the combustion operations in the internal-combustion engine, the invention proposes a method of operating the exhaust system in which regeneration is effected by changing the fuel mix using the engine management system, which involves in particular increasing the level of carbon monoxide in the exhaust gas which is generated. Therefore, for example, the operating cycles of the internal-combustion engine with an increased fuel level with regard to the fuel mix are provided, in which, on account of the "rich" mix preparation, an increased level of unsaturated hydrocarbons and carbon monoxide is produced. The increased level of unsaturated hydrocarbons and carbon monoxide, in combination with the temperatures that prevail, leads to nitrogen oxides being reduced to form pure nitrogen, since the oxygen affinity of the unsaturated hydrocarbons and of carbon monoxide is greater.

According to a further configuration of the operating method, the regeneration is effected by a separate fuel-mix change in an individual combustion chamber, or a plurality of combustion chambers alternately generating an increased level of carbon monoxide in the exhaust gas that is generated. This particularly preferably takes place alternately in in each case one combustion chamber of the plurality of combustion chambers. This results in, for example, that in each case only one combustion chamber is supplied with a "rich" fuel-air mix, with the remaining combustion chambers being operated in the "lean" range. Despite the frequent regeneration by injecting an increased level of fuel, this nevertheless leads to a very low fuel consumption by the internal-combustion engine. This is related in particular to the fact that no further component for chemical conversion is disposed between the very small support bodies according to the invention. Hitherto, it has been customary for relatively large-volume oxidation catalytic converters to be connected upstream of the adsorber. However, this has the consequence that an increased injection of fuel has to take place to a greater extent than that which would be sufficient to regenerate the adsorber, since some of the unsaturated hydrocarbons and the carbon monoxide produced have already been converted in the upstream oxidation catalytic converter. The direct configuration of the support body according to the invention close to the engine allows very precise and accurately calculated supply of a very small amount of fuel that is just sufficient for regeneration.

other features which are considered as characteristic for the invention are set forth in the appended claims.

Although the invention is illustrated and described herein as embodied in a small-volume $No_x$ adsorber, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, perspective view depicting an automobile with an internal-combustion engine and an exhaust system;

FIG. 2 is a diagrammatic, perspective view of a structure of an embodiment of a support matrix according to the invention;

DESCRIPTION OF THE PREFERRED EMBODIMENTS

Figure 3:
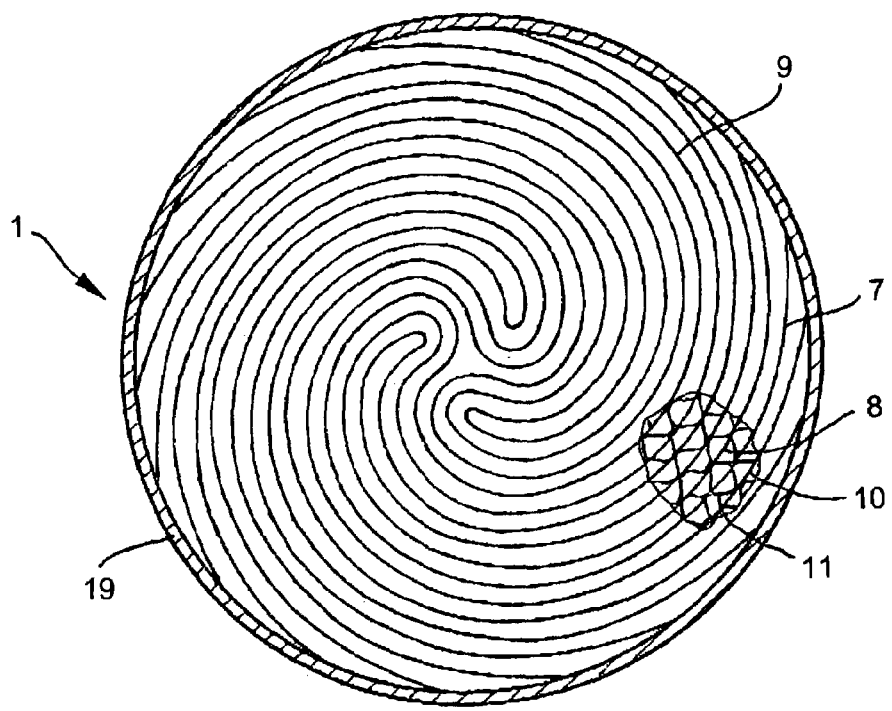
FIG. 3 is a sectional view through a further embodiment of the support body according to the invention.

Referring now to the figures of the drawing in detail and first, particularly, to FIG. 1 thereof, there is shown an automobile 21 with an internal-combustion engine 4. The internal-combustion engine 4 has an engine management system 25 which controls combustion operations in four combustion chambers 3. The four combustion chambers 3 have a combustion chamber volume 5 that is composed of the individual part-volumes of the combustion chambers 3. A fuel-air mix is burnt in the combustion chambers 3, and an exhaust gas that is generated during the combustion is then passed through an exhaust system 20. In the process, the exhaust gas is cleaned and is then discharged to the environment. The exhaust system 20 connected downstream of the internal-combustion engine 4 has an exhaust pipe 26, in which, as seen in a direction of flow to the rear of the automobile 21, there is a preliminary catalytic converter 24, a support body 1 according to the invention, a main catalytic converter 23 and a muffler 22. The preliminary catalytic converter 24 is configured, for example, to be electrically heatable, with the result that catalytic conversion of pollutants in the exhaust gas is possible even after a very short time following a cold start of the internal-combustion engine 4. The support body 1 has an adsorber material 2 (FIG. 4) for adsorbing nitrogen oxides in the exhaust gas and is disposed downstream. The support body 1 in this case has an adsorber volume 6 (FIG. 2) that is from 0.5% to 75% of the combustion chamber volume 5 of the internal-combustion engine 4. The support body 1 adsorbs the nitrogen oxides during certain operating states of the internal-combustion engine 4 or of the exhaust system 20. During suitable operating states, the nitrogen oxides are desorbed from the support body 1 and are reduced to form nitrogen in the downstream main catalytic converter 23. The pressure fluctuations in the exhaust-gas flow that arise as a result of the explosive combustion are reduced in the muffler 22, with the result that the noise pollution from the automobile 21 is reduced.

FIG. 2 shows a diagrammatic and perspective view of an embodiment of the support body 1 with its adsorber volume 6. The support body 1 has a first zone 16 and a second zone 18 disposed in succession axially 27 in a direction of flow 17. The first zone 16 has the adsorber material 2 for adsorbing nitrogen oxides, while the second zone 18 is configured with a catalytically active coating 15 (FIG. 5) for reduction of nitrogen oxides. The exhaust gas flows through the support body 1 through a large number of passages 8, which run substantially parallel to the axis 27. The support body 1 is in this case configured with a tubular jacket 19 that is used, for example, to fix the support body 1 in the exhaust system 20.

FIG. 3 diagrammatically depicts a sectional view through a second embodiment of the support body 1 according to the invention with the tubular jacket 19. The support body 1 in this case has sheet-metal layers 9, at least some of which are structured in such a way that the exhaust gas can flow through them. For this purpose, the sheet-metal layers 9 have corrugated metal sheets 11 and smooth metal sheets 10, which delimit the passages 8 through which the exhaust gas can flow. The mean number of passages 8 over a cross section 7 of the support body 1 is in this case, for example, 800 cpsi (cells per square inch).

Figure 4:
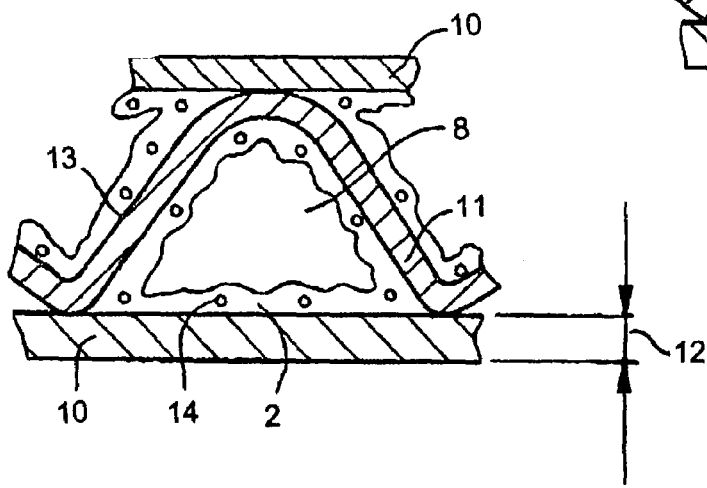
FIG. 4 is a partial, sectional view of a first detailed view of the support body.

FIG. 4 diagrammatically depicts a detailed view of the adsorber material 2 for adsorbing nitrogen oxides in the exhaust gas in the first zone 16. The support body 1 is in this case formed by the smooth metal sheets 10 and the corrugated metal sheets 11, which have a thickness 12 of 0.012 mm to 0.08 mm. The passages 8 which are delimited in this way are coated with the adsorber material 2, the adsorber material 2 having a zeolite structure 13 and potassium oxide constituents 14. This ensures a particularly high storage capacity for nitrogen oxides.

Figure 5:
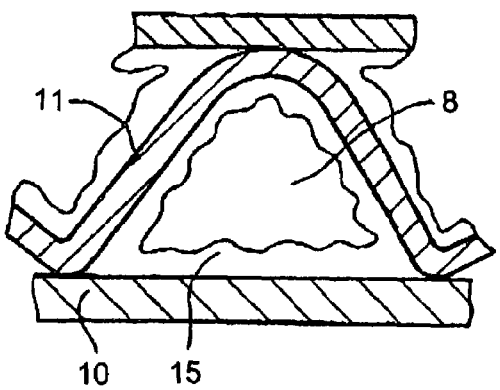
FIG. 5 is a partial, sectional view of a second detailed view of an embodiment of the support body.

FIG. 5 diagrammatically depicts a detailed view of the passage 8 of the support body 1 in the second zone 18. The smooth metal sheets 10 and the corrugated metal sheets 11 of the support body 1 have the catalytically active coating 15 for reducing the nitrogen oxides which has already been desorbed.

Figure 6:
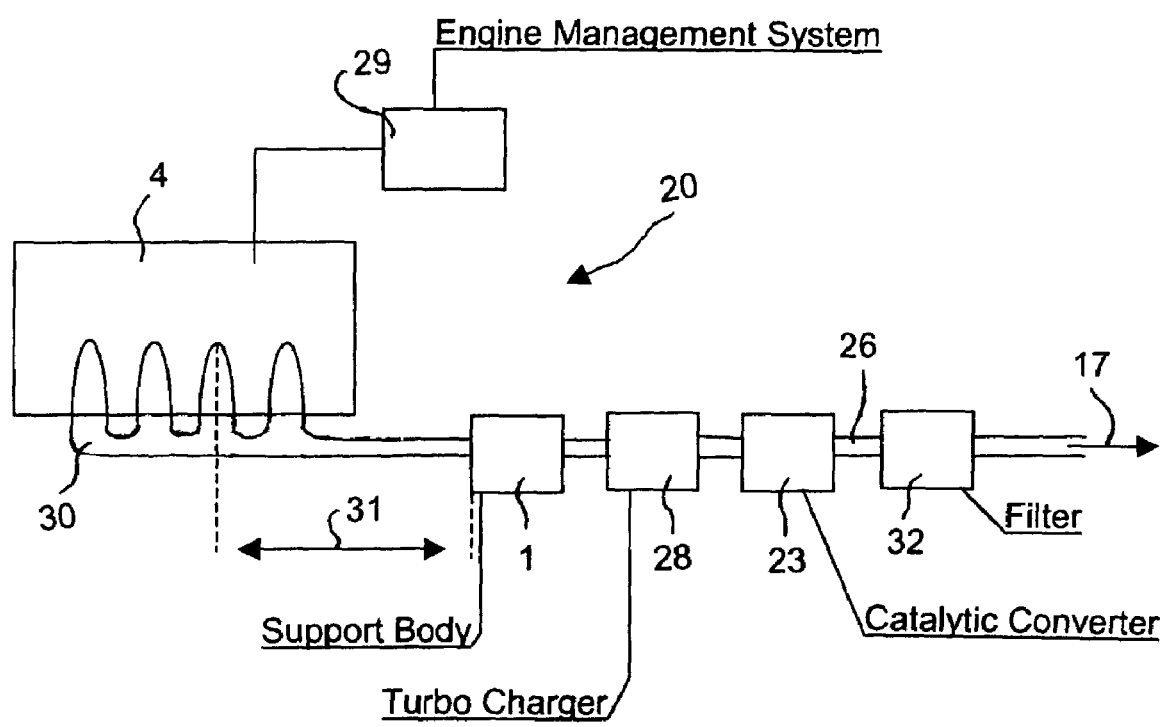
FIG. 6 is a block diagram of the structure of an exhaust system with the support body installed close to an engine.

FIG. 6 diagrammatically depicts the configuration of the exhaust system 20 of the internal-combustion engine 4, which in this case is configured in particular as a diesel engine. The exhaust system 20 contains the exhaust pipe 26 which connects the at least one combustion chamber 3 of the internal-combustion engine 4 to the environment and in which components 1, 23, 28, 32 for converting pollutants contained in the exhaust gas of the internal-combustion engine 4 are disposed. The exhaust system 20 is distinguished by the fact that the support body 1 is connected directly downstream of the internal-combustion engine 4, as seen in the direction of flow 17 of the exhaust gas. In this case, the support body 1 is disposed at a distance 31 of less than 80 cm from the at least one combustion chamber 3, in particular is even disposed in the interior of an exhaust manifold 30 and preferably upstream of a turbo charger 28. By way of example, the main oxidation catalytic converter 23 and a filter 32 may additionally be connected downstream of the support body 1.

The method of operating the exhaust system 20 involves discontinuous regeneration of the support body 1, which has the adsorber material 2 for adsorbing nitrogen oxides, within a time of less than 5 seconds. In particular, an engine management system 29 is provided to control the combustion operations in the internal-combustion engine 4, and this system effects regeneration by changing the fuel-air mix by the engine management system 29, in particular the level of carbon monoxide in the exhaust gas which is generated being increased. The regeneration preferably takes place as a single combustion chamber regeneration, in which each combustion chamber is alternately supplied with a rich mix.

The invention therefore describes a support body having the adsorber material 2 for adsorbing nitrogen oxides in the exhaust gas that is generated in at least one combustion chamber 3 of the internal-combustion engine 4, as well as a method for operating the internal-combustion engine having the exhaust system that has the support body 1 of this type. All the combustion chambers 3 of the internal-combustion engine 4 together have an overall combustion chamber volume 5, and the support body 1 has the adsorber volume 6, the adsorber volume 6 being configured to be less than 75%, in particular less than 45%, and preferably even less than 5% of the combustion chamber volume 5. The support body of this type ensures a good cold-starting performance of the exhaust system and prevents the emission of nitrogen oxides, in particular when using the proposed method of operating the exhaust system.

I claim:

1. A support body, comprising:
   an adsorber material for adsorbing nitrogen oxides in an exhaust gas generated in at least one combustion chamber of a plurality of combustion chambers of an internal-combustion engine, all the combustion chambers together defining a combustion-chamber volume; and
   a support body structure carrying said adsorber material and having a volume, said volume of said support body structure is less than 75% of the combustion-chamber volume.

2. The support body according to claim 1, wherein said support body structure has a cross-section and a number of passages formed therein and distributed over said cross-section and through which the exhaust gas can flow, a mean passage density of said passages over said cross-section is between 400 cpsi and 1200 cpsi.

3. The support body according to claim 2, wherein said support body structure is formed of sheet-metal layers, at least some of said sheet-metal layers are structured such that they form said passages through which the exhaust gas can flow.

4. The support body according to claim 3, wherein said sheet-metal layers are configured using metal sheets which have a thickness of from 0.012 mm to 0.08 mm.

5. The support body according to claim 1, wherein said adsorber material has at least one of a zeolite structure and potassium oxide constituents.

6. The support body according to claim 1, including a catalytically active coating for reducing nitrogen oxides disposed on said support body structure.

7. The support body according to claim 6, wherein said support body structure has a first zone and a second zone downstream of said first zone as seen in a flow direction of the exhaust gas, said adsorber material disposed in said first zone, and said catalytically active coating disposed in said second zone.

8. The support body according to claim 4, wherein said thickness of said metal sheets is less than 0.03 mm.

9. The support body according to claim 1, wherein said volume of said support body structure is less than 45% of the combustion-chamber volume.

10. The support body according to claim 1, wherein said volume of said support body structure is less than 5% of the combustion-chamber volume.

11. An exhaust system for an internal-combustion engine, comprising:
an exhaust pipe connecting combustion chambers of the internal-combustion engine to an environment; and
components for converting pollutants contained in an exhaust gas generated by the internal-combustion engine disposed in said exhaust pipe, said components including a support body having an adsorber material for adsorbing nitrogen oxides in the exhaust gas generated in the combustion chambers of the internal-combustion engine, all the combustion chambers together having a combustion-chamber volume and said support body further having a support body structure carrying said adsorber material and having a volume, said volume of said support body structure is less than 75% of the combustion-chamber volume, said support body disposed immediately downstream of the internal combustion engine as seen in a direction of flow of the exhaust gas.

12. The exhaust system according to claim 11, wherein said support body is disposed at a distance of less than 80 cm from at least one of the combustion chambers.

13. The exhaust system according to claim 12, wherein said support body is disposed in an interior of an exhaust manifold of the internal-combustion engine.

14. The exhaust system according to claim 11, wherein said support body is disposed upstream of a turbo charger.

15. A method of operating an exhaust system of an internal combustion engine, which comprises the steps of:
providing a support body according to claim 1;
regenerating discontinuously the support body having the adsorber material for adsorbing nitrogen oxides and the discontinuous regeneration takes place within a time of less than 5 seconds.

16. The operating method according to claim 15, which comprises performing the discontinuous regeneration in less than 1 second.

17. The operating method according to claim 15, which comprises:
providing an engine management system for controlling combustion operations in the internal-combustion engine, and in the engine management system regeneration is effected by changing a fuel mix using the engine management system, which involves increasing a level of carbon monoxide in an exhaust gas which is generated.

18. The operating method according to claim 15, which comprises effecting the regeneration by a separate fuel-mix change in an individual one of the combustion chambers.

19. The operating method according to claim 15, which comprises effecting the regeneration by a separate fuel-mix change in a plurality of combustion chambers alternately generating an increased level of carbon monoxide in the exhaust gas which is generated.

20. The operating method according to claim 19, which comprises burning the separate fuel mix for generating the increased level of carbon monoxide alternately in each case one combustion chamber of the plurality of combustion chambers.

* * * * *